United States Patent [19]

Tichelaar et al.

[11] Patent Number: 5,323,236
[45] Date of Patent: Jun. 21, 1994

[54] AN EXTENDED TELEVISION SIGNAL ENCODING AND DECODING SYSTEM COMPRISING CONTROL DATA FOR CONTROLLING THE DECODER

[75] Inventors: Johannes I. J. Tichelaar; Constant P. M. J. Baggen, both of Eindhoven, Netherlands

[73] Assignee: U.S. Philips Corporation, New York, N.Y.

[21] Appl. No.: 15,192

[22] Filed: Feb. 10, 1993

[30] Foreign Application Priority Data

Feb. 13, 1992 [EP] European Pat. Off. ........ 92200407.2

[51] Int. Cl.$^5$ ............................................. H04N 07/00
[52] U.S. Cl. .................................................... 358/141
[58] Field of Search ............... 358/141, 142, 146, 147, 358/11; H04N 7/02, 7/04

[56] References Cited

U.S. PATENT DOCUMENTS

| | | |
|---|---|---|
| 4,730,188 | 3/1988 | Milheiser . |
| 5,027,206 | 6/1991 | Vreeswijk et al. ................. 358/141 |
| 5,111,292 | 5/1992 | Kuriacuse et al. ................. 358/133 |
| 5,148,272 | 9/1992 | Acompara et al. ................. 358/133 |
| 5,175,626 | 12/1992 | White ............................. 358/191.1 |

FOREIGN PATENT DOCUMENTS 0448152  3/1991  European Pat. Off. .

Primary Examiner—Victor R. Kostak
Assistant Examiner—Nathan J. Flynn
Attorney, Agent, or Firm—Michael E. Marion

[57] ABSTRACT

An extended television signal comprises control data for controlling an extended television decoder. The control data comprise first information bits (NB) for conveying information which need not be very reliably decodable immediately upon switching between broadcast channels or when their contents have changed. Each first information bit (NB) is channel-encoded by means of a first DC-free channel code into first channel bits each having a first duration (2 Tc). The control data further comprise second information bits (LB) for conveying information which must be very reliably decodable immediately upon switching between broadcast channels or when their contents have changed. Each second information bit (LB) is channel-encoded by means of a second DC-free channel code into second channel bits which each have a second duration (10 Tc) exceeding the first duration (2 Tc).

11 Claims, 2 Drawing Sheets

AN EXTENDED TELEVISION SIGNAL ENCODING AND DECODING SYSTEM COMPRISING CONTROL DATA FOR CONTROLLING THE DECODER

BACKGROUND OF THE INVENTION

The invention relates to an extended television signal comprising control data for controlling an extended television decoder, to a method of encoding the extended television signal, and to a decoder for decoding the extended television signal.

Such an extended television signal is known, because the MAC signal has such control data for, for example, indicating the aspect ratio of the extended television signal. When such control data remain valid over several successive frames of the extended television signal, the control data can be reliably decoded by comparing the data transmitted during a number of successive frames, and by taking a kind of majority decision. However, when a part of such data may change from frame to frame or has to be reliably decodable immediately upon switching between broadcast channels, no such reliable decoding method is possible.

SUMMARY OF THE INVENTION

It is, inter alia, an object of the invention to provide an extended television system including control data which can also be reliably decoded immediately upon switching between broadcast channels or when its contents have changed.

For this purpose, a first aspect of the invention provides an extended television signal as defined in claim 1. A second aspect of the invention provides an extended television encoding method as defined in claim 7. A third aspect of the invention provides an extended television decoder as defined in claim 9. Advantageous embodiments are set out in the subclaims.

According to the invention, a distinction is made between a first type of information bits which need not be very reliably decodable immediately upon switching between broadcast channels or when their contents have changed, and a second type of information bits which must be very reliably decodable in such circumstances. Of course, it is desired that also the first type information bits are reliably decoded, but in the circumstances mentioned, a certain measure of decoding unreliability is accepted while the second type information bits should be reliably decodable, also when no comparison in time is possible. Each second type information bit is channel encoded into second channel bits each having a longer duration than first channel bits into which each first-type information bit is encoded. When, for example, a 5 MHz clock signal is used, each first-type channel bit lasts 200 ns while each second channel bit lasts, for example, at least 600 ns. The channel codes are DC-free, and preferably biphase.

As the second channel bits have a duration exceeding that of the first channel bits, a version of received first channel bits, which appears shifted as an echo, will never match the second channel bits or their inverse. Therefore, even if such an echo were to appear with an amplitude larger than the original, the second channel bits could be reliably recognized. To allow for a more reliable decoding, the second channel bits have a duration which is preferably at least three times longer than that of the first channel bits, so that a decoder for these second channel bits can integrate the received channel bits and thus provide an improved signal-to-noise ratio. When the second-type information bits are repeated during the current frame, a majority decision becomes possible so that the decoding reliability is further improved. When these measures are combined, a very reliable decoding is obtained so that it is even attractive to use the second type information bits for data for which the need for a secure transmission is larger than the need for the possibility of changing the data from one frame to the other.

It is to be noted that EP-A-0,448,152 (PHN 13,273) discloses a remote control device which transmits a sequence of biphase encoded information bits. A first biphase encoded bit has a duration which is twice that of the normal biphase encoded information bits to indicate the start of the bit sequence. This long start bit has always the same value. In the bit sequence, at a fixed duration after the first long start bit, there may be a second biphase encoded bit of double length whose data content has no special meaning compared to the other, short biphase encoded information bits. In a correctly received sequence, the second long bit should be received at this fixed duration after the first long start bit. Thus, the second long bit is used to verify that the first long bit is indeed the start bit. It is thereby avoided that a 0|1|0 transition of normal, short biphase encoded information bits which looks like $-1;1|1;-1|-1;1$, is considered to comprise the long start information bit which looks like $1,1;-1,-1$, because at said fixed duration after this 0|1|0 transition, no second long bit will be received.

U.S. Pat. No. 4,730,188 discloses an FM-modulated biphase signal having 8 biphase bit periods sync and 40 biphase bit periods data. The sync consists of 4 normal biphase bits which are zero, 1 long biphase bit which occupies 3 normal biphase bit periods and which is zero too, and 1 normal biphase bit which is zero. Thus, the prior art long bit contains no information and has only an extended duration for synchronization purposes.

None of these documents discloses a control signal that is transmitted with an extended television signal and which contains, on the one hand, data which will remain the same for several successive frame periods and which thus can be reliably decoded by comparing the data contained in these successive frame periods, and on the other hand, data which may change from frame to frame and which should be reliably decodable using the data of only the present frame. None of these documents shows that the long bit should be long so that its contents are thus more reliably decodable and echo-resistant.

These and other aspects of the invention will be apparent from and elucidated with reference to the embodiments described hereinafter.

DETAILED DESCRIPTION OF PREFERRED EMBODIMENTS OF THE INVENTION

In the PALplus system, some control bits have to be transferred from the transmitter to the receiver, which indicate important system parameters such as, for example the aspect ratio (4:3 or 16:9), whether the signal is picked up by a camera or from film, the manners of chroma and sound encoding, whether the video signal is a PALplus signal or a standard PAL signal, whether the "black bars", which result when a 16:9 aspect ratio picture is transmitted within a 4:3 aspect ratio picture, contain video information to increase the vertical resolution, and the type of PAL encoding used (PAL B, G, I, or H). The number of bits should be at least eight, but preferably more than 16. Furthermore, at least one bit may switch at each frame, while the others will only change once every so many seconds. It is envisioned to use the inactive part of line 23 for transmission of these bits, i.e. up to 32 μs is available for transmission, see CCIR report 624. It is of the utmost importance to receive the PALplus bits reliably, even under worse conditions than at the border of the service area. The effects of distorted PALplus data may be disastrous. For example, when the aspect ratio bit toggles, which is dependent on threshold effects, the visible effect in the picture will be most dramatic. It is known from measurements that at several places in Europe, both VPS and Teletext data transmissions suffer from transmission artifacts, mainly echoes and noise. VPS stands for Video Programm System, in which a video recorder control signal is transmitted with the television signal to ensure that the video recorder starts and stops recording at the right instants. In the VPS system, one uses a majority decision over a time interval of as long as a minute to reach a conclusion. To create a very robust PALplus data signal, the invention provides a new line code.

In one embodiment, one bit can be accommodated for information which may change from frame to frame. For this bit one cannot rely on majority decision over several frames; hence one has to improve the reliability within the data line itself. In a preferred embodiment, this is done by repeating it at non-equal distances (to avoid misdetection by echoes).

Figure 1:
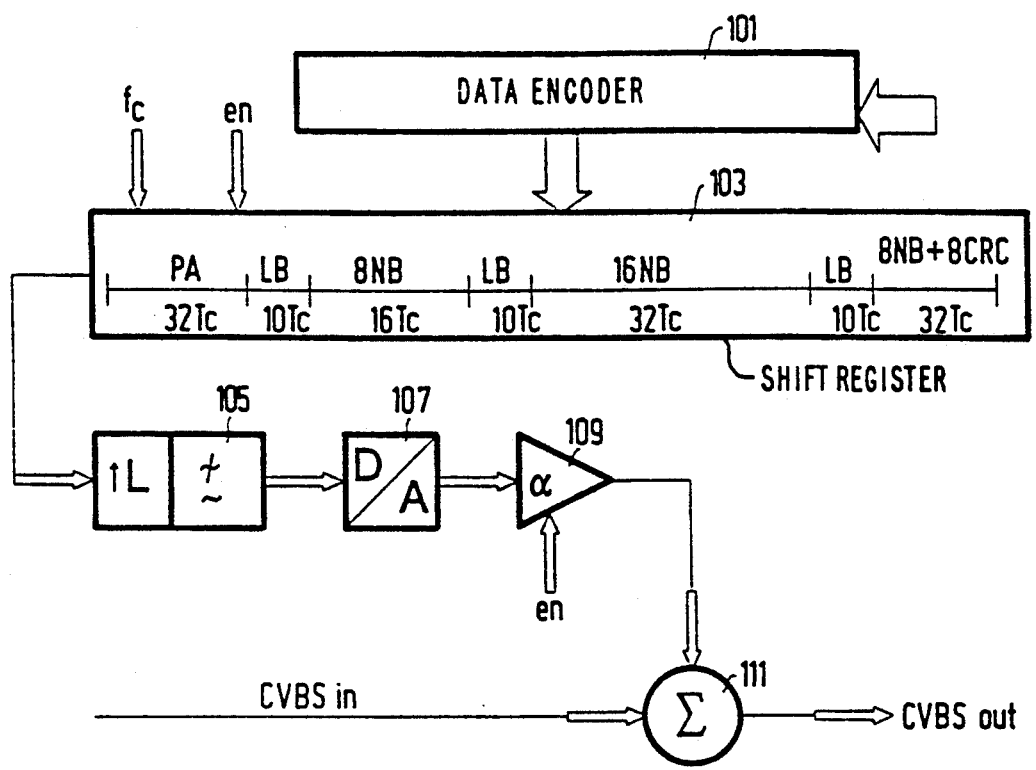
FIG. 1 shows an embodiment of an encoding arrangement according to the invention.

In the encoding arrangement of FIG. 1, input data is applied to a data encoder 101, in which for each frame period a sequence of biphase encoded bits is generated which comprises a preamble, a first type of information bits for conveying information which need not be very reliably decodable immediately upon switching between broadcast channels or when their contents have changed, a second type of information bits which must be very reliably decodable in such circumstances, and error detection/correction bits. This sequence is copied to a shift register 103 which is clocked by a clock signal having a clock frequency fc=5 MHz. Alternatively, the clock frequency fc may be locked to the color subcarrier. In the shift register 103, the bit sequence in a preferred embodiment comprises, 32 clock periods Tc preamble PA, 10 clock periods Tc for 1 long biphase encoded information bit LB which is a second bit, 16 clock periods Tc for 8 normal biphase encoded information bits NB which are first bits, 10 clock periods Tc for a first repeat of the long biphase encoded information bit LB, 32 clock periods Tc for 16 normal biphase encoded information bits NB, 10 clock periods Tc for a second repeat of the long biphase encoded information bit LB, and finally 32 clock periods Tc which are preferably used for 8 normal biphase encoded information bits and 8 cyclic redundancy check (CRC) bits, but which may be used for 16 CRC bits. As is well known, a binary 1 is biphase encoded as $+1;-1$ while a binary 0 is biphase encoded as $-1;+1$. A normal length biphase encoded information bit takes 2 clock periods Tc, viz. 1 Tc for its first binary channel bit and 1 Tc for its second binary channel bit, while in this embodiment, a long biphase encoded information bit takes 10 clock periods Tc, viz. 5 Tc for its first long binary channel bit and 5 Tc for its second long binary channel bit. The numbers of clock periods Tc between the original long biphase encoded information bit LB and its first repeat one the one hand, and between the first repeat and the second repeat on the other hand, are chosen to be different to prevent that when an echo of the original long biphase bit mutilates the first repeat, a similar echo of the first repeat mutilates the second repeat. Instead of three repeats of the same long biphase encoded information bit LB, three different long biphase encoded information bits LB may be transmitted as well. Also in that situation, it is desired that the number of normal biphase encoded information bits NB between the first and the second long biphase information bits LB differs from the number of normal biphase encoded information bits NB between the second and the third long biphase encoded information bits LB.

The preamble could contain a sine-shaped signal as a training signal for a data synchronizer. The frequency of the sine could be chosen to be equal to fc/2 or fc. A sine signal sequence of frequency fc/2 can be generated very easily by biphase encoding of consecutive "1", or "0" information bits. Alternatively, the preamble could contain a bit sequence with good aperiodic correlation properties such as, for example, a Barker sequence. Barker sequences are described in R. E. Ziemer and W. H. Tranter, *Principles of Communications—systems, modulation, and noise*, Houghton Mifflin Company, Boston U.S.A., 2nd edition, pp. 414-415. The good aperiodic correlation properties of such a sequence could be used for precise location of the first occurring data bit in the PALplus control signal. This property could also be used by a synchronizer, for example, for phase lock. A Barker sequence of length 13 seems to be appropriate ($\{+1,+1,+1,+1,+1,+1,-1,-1,+1,+1,-1,+1,-1,+1\}$). If this Barker sequence is biphase modulated, it starts with 5 periods sine with frequency fc/2, which could be used as a training period for a data synchronizer. The preamble could also contain a smart mixture of these two options. For example, 12 periods of a sinewave with frequency fc/2, followed by a length 7 Barker sequence.

Upon receipt of the enable signal EN which indicates the first half (of) up to 32 μs of the first active video line, the shift register 103 applies the bit sequence to a half-Nyquist filter 105, which preferably includes a sample number upconverter section to allow for a more precise filtering. The filtered bit sequence is made analog by D/A converter 107 which applies the analog control signal to an amplifier 109. Upon receipt of the enable signal EN, the amplifier 109 applies the control signal to an adder 111 which adds the control signal to the video signal CVBSin to obtain the output video signal CVBSout.

A Nyquist pulse with a cosine roll-off amplitude spectral density and a roll-off factor equal to one (cosine shaped amplitude spectral density) is preferably used as elementary pulse shape. Nyquist pulses are described in detail in H. Nyquist, *Certain Topics in Telegraph Transmission Theory*, AIEE Transactions, vol. 47, pp. 617–644, April 1928, and in R. A. Gibby and J. W. Smith, *Some extensions of Nyquist's Telegraph Transmission Theory*, BSTJ, vol. 44, pp. 1487–1510, September 1965. For clarity, this pulse shape should be present at detection time at the decoder. The main property of a Nyquist pulse is the lack of intersymbol interference (ISI) at the optimal data sample moments.

Figure 2:
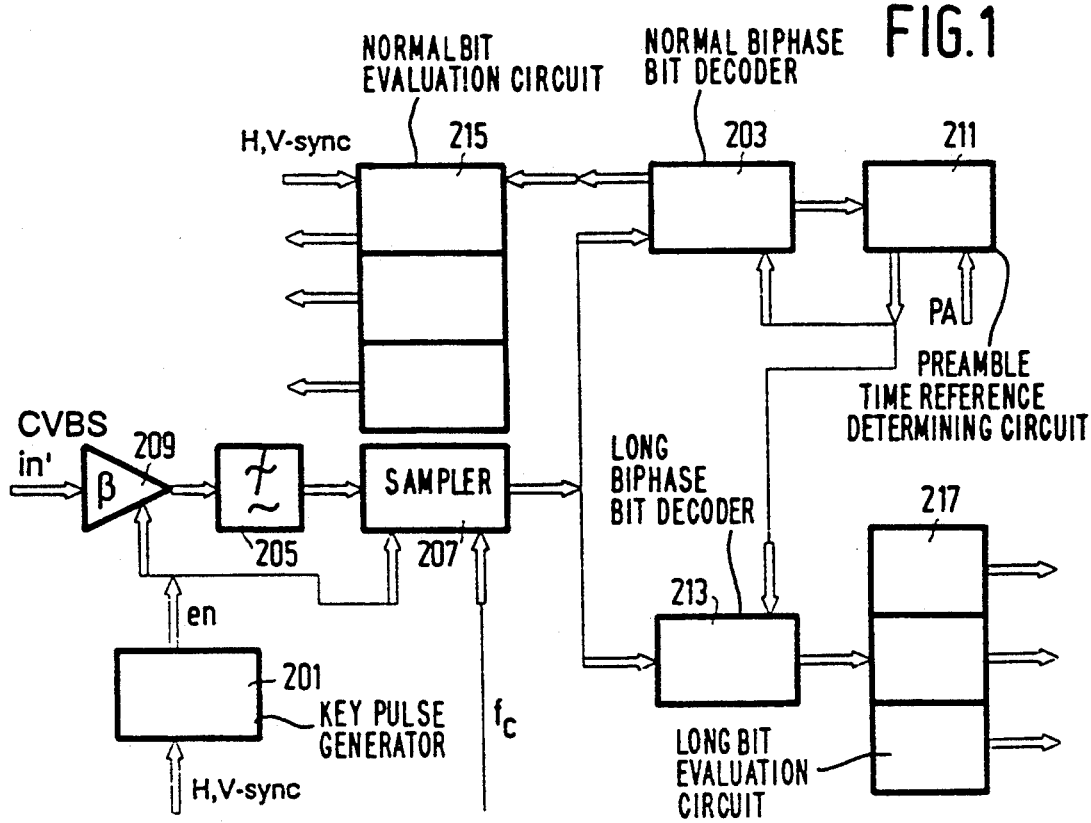
FIG. 2 shows a first embodiment of a decoding arrangement according to the invention.

In order to create the mentioned elementary pulse shape at the decoder's data detector, it is preferred to split a (full) Nyquist filter into two matched half-Nyquist filters, one located at the encoder output (filter 105 in FIG. 1), and one located at the decoder input (filter 205 in FIG. 2). The amplitude transfer function is given by $$H(f) = \begin{cases} \cos\left(\frac{\pi}{2}\frac{f}{f_c}\right) & 0 \leq f \leq f_c \\ 0 & \text{elsewhere} \end{cases}$$

For further details, see J. G. Proakis, *Digital Communications*, 2nd edition, 1989, pp. 535,536. The half-Nyquist filter 105 at the encoder output shapes the data signal in such a way that it fits well into the channel. The decoder pre-filter 205 is a special kind of low-pass filter which, together with the encoder post-filter 105, constitutes a full Nyquist filter. Compared to the situation in which a full Nyquist filter is placed at the encoder and a (e.g. 5 MHz) lowpass filter is placed at the decoder, the division of the Nyquist filter into two half-Nyquist filters further yields a SNR improvement of 1.5 dB. A solution which allows for a very cheap decoder having an input filter which consists of an R-C member only, is obtained when the encoder filter has for its frequency response the full Nyquist filter frequency response divided by the frequency response of the R-C member.

In FIG. 2, the input video signal CVBSin' of the decoding arrangement is applied to an amplifier 209 which is controlled by an enable signal EN to select the control data part. The enable signal EN is furnished by a key pulse generator 201 which receives the horizontal and vertical synchronizing signals H, V sync. The amplifier 209 is coupled, through the half-Nyquist filter 205, to a sampler 207. The sampler 207 is controlled by a clock signal of frequency fc, which may be regained from the preamble of the control signal in a similar manner as the preamble of the Video Program System (VPS) is used to regenerate a data clock signal. Alternatively, the clock signal frequency fc may be coupled to the color subcarrier. The sampler 207 applies the time-discrete samples to a biphase decoder 203 suitable for biphase bits of normal length. The decoder 203 is coupled to a preamble time reference determining circuit 211 which compares the beginning of the received sequence with a replica of the a priori known preamble, i.e. the preamble as it should be and which is stored in the decoding arrangement. By comparing the stored preamble with the received sequence, an indication can be obtained when the information data bits start. This indication is passed from the preamble time reference determining circuit to the normal biphase bit decoder 203 and to a long biphase bit decoder 213. Preferably, the structure of the control data as illustrated in shift register 103 of FIG. 1, is part of the transmission standard, so that both the normal biphase bit decoder 203 and the long biphase bit decoder 213 know when after receipt of the indication obtained by the preamble time reference determining circuit 211, a normal biphase bit or a long biphase bit can be expected.

The normal biphase bit decoder 203 applies the decoded bits to a normal bit evaluation circuit 215 which is illustrated to have 3 subblocks to indicate that it may operate in accordance with several possible evaluation schemes. In reality, only one scheme will be selected. As the normal bits are used for conveying information which may remain the same over several successive frames of the extended television signal, a hard decision output of the normal biphase bit decoder 203 can be subjected to a majority voting over a predetermined number of frames. Alternatively, the decoder 203 consists of a slicer providing analog levels which are integrated over a predetermined number of frames. In another evaluation scheme, the error detection/correction bits are used to decode the normal bits or to indicate whether the decoding was faulty. Preferred CRC generators/checkers are the integrated circuits 8X01A or 9401 manufactured by Signetics; a description appeared in Philips data handbook IC19 of 1988, Data Communication products, pp. 3–120 to 3–124. A distance-4 protection is made by using the polynomial $$p(X) = X^8 + X^7 + X^5 + X^4 X + 1$$

For further details, reference is made to A. M. Michelson and A. H. Levesque, *Error-Control Techniques for Digital Communication*, Wiley, 1985. In a third evaluation scheme, some smart mixture of CRC check and interframe evaluation is used. For example, the decoded information bits of each data line which is indicated to be "good" by the CRC checker, are stored in a register which has a capacity to store, for example, the information bits of 5 of such good data lines. After each newly stored line, a majority decision is carried out for each information bit of the data line on the last 5 received good samples of that information bit. Consequently, it is further possible to have some measure about the decoding reliability as the decoding is more reliable when all five samples, or four out of these five samples, are identical than when it is a 3 against 2 majority.

The long biphase bit decoder 213 applies the decoded bits to a long bit evaluation circuit 217 which is illustrated to have 3 subblocks to indicate that it may operate in accordance with several possible evaluation schemes. In reality, only one evaluation scheme will be selected. As the long bits are used for conveying information which may change from frame to frame of the extended television signal, no interframe evaluation can be used. However, in a preferred embodiment, the long bit is transmitted three times per frame period so that an intraframe majority voting based on hard decisions on each of the three occurrences can be used. If the long biphase bit decoder 213 supplies analog levels, these levels may be added over the three occurrences of the long bit so that by this integration, a decoding with a high signal to noise ratio (SNR) is obtained. In a third evaluation scheme, some smart mixture of majority decision and analog integration is used.

Figure 3:
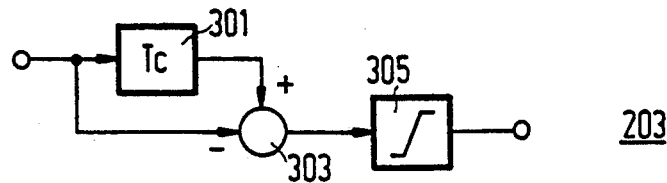
FIG. 3 shows an embodiment of a decoder for first bits of normal duration.

FIG. 3 shows a preferred embodiment of the decoder 203 for first biphase bits of normal duration. The samples are applied to a delay 301 of one clock period Tc. The applied samples are subtracted from the delayed samples by subtracter 303. When a proper biphase bit is received, the result will be either +2 or −2; on the transition of two biphase bits, the result will be +2, 0 or −2 depending upon the values of the preceding and subsequent bits. Up till now, the result may have been time-discrete but with a continuous amplitude. The subtracter output is applied to a slicer 305 which gives hard decisions.

Figure 4:
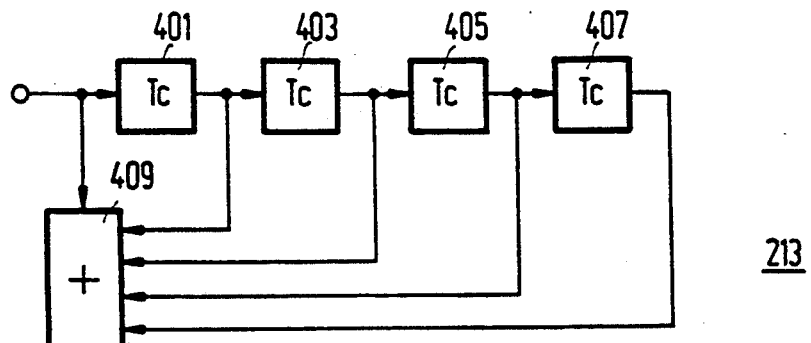
FIG. 4 shows an embodiment of a decoder for second bits of long duration.

FIG. 4 shows a preferred embodiment of the decoder 213 for second biphase bits of long duration. The samples are applied to a series of four delays 401 to 407 which each delay by one clock period Tc. Adder 409 integrates the results of five subsequent clock periods. By this integration, the decoding reliability is greatly improved. The integration result is delayed by 5 clock periods Tc in delay 411. The integration result is subtracted from the delayed integration result by substructure 413. The subtracter output is applied to a slicer 415 which gives hard decisions.

Alternative embodiments of the circuits 203 and 213 are of course possible. Two received channel bits are combined by the subtraction in subtracter 303 before the evaluation in slicer 305. This yields a better SNR than when the two channel bits in a biphase encoded information bit are first sliced and then evaluated. In this last-mentioned possibility, however, it is possible to detect a violation of the biphase method in order to detect transmission errors. In the embodiment shown, transmission errors can be detected when the slicers 305 and 415 yield a zero output when the difference between two successive channel bits is lower than a given threshold.

It is possible to use the normal biphase bit decoder 203 to decode long biphase bits too. Then, 2 zero results, 1 information output, and 2 zero results are obtained when a long biphase bit is decoded. When the received channel bits are sliced before their evaluation, instead of two zero results, two violations of the biphase encoding algorithm are detected. Again, 2 violations, 1 good result, and 2 violations, indicate receipt of a long biphase bit. The embodiment is cheaper, but the possibility of improving the SNR by integration of the channel bits of the long information bit and its echo robustness are lost.

The subtracter 303 and the slicer 305 may be combined to one slicing differential amplifier. The same applies to the subtracter 413 and the slicer 415.

Figure 5:
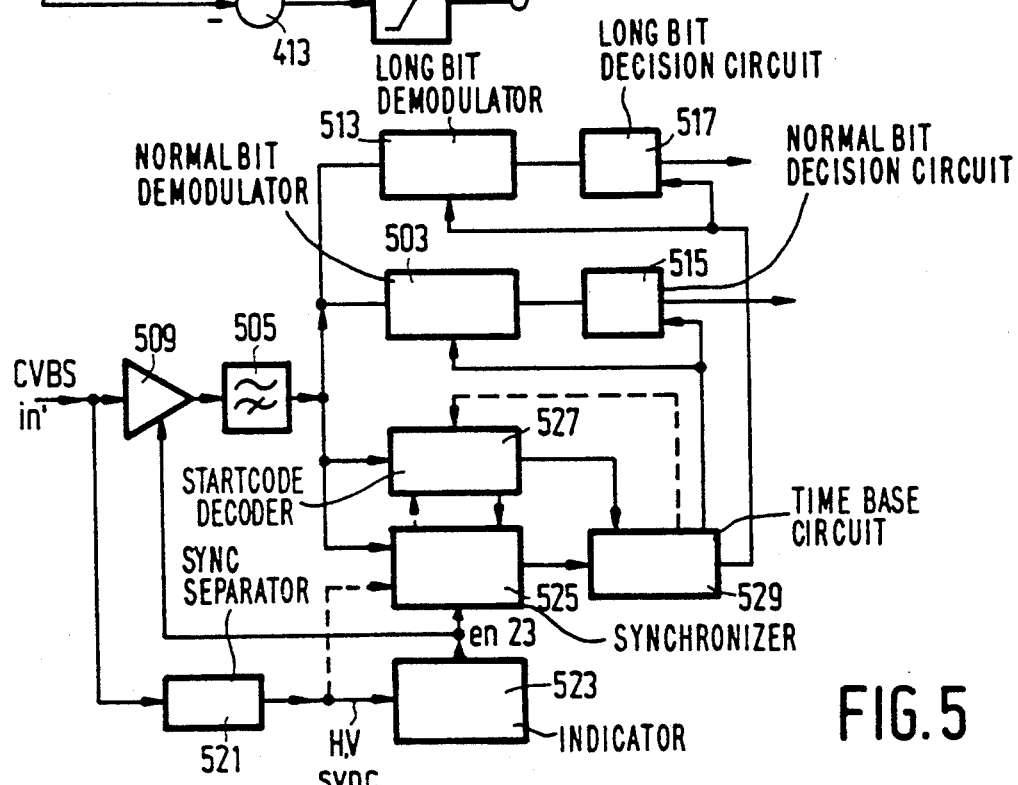
FIG. 5 shows a second embodiment of a decoding arrangement according to the invention.

FIG. 5 shows a second embodiment of a decoding arrangement according to the invention. The decoder input video signal CVBSin' is applied to a sync separator 521 which furnishes H, V composite sync signals to a field selector and line 23 indicator 523. During the first half of line 23, the field selector and line 23 indicator 523 furnishes an enable signal EN23 to an input gate 509 and to a synchronizer 525 which comprises a 5 MHz oscillator which has to be locked to the startcode contained in the preamble of the line 23 data signal and detected by a startcode detector 527. A dashed line indicates that the synchronizer 525 may receive the H, V composite sync signal. The input gate 509 furnishes the line 23 data signal after input filtering in an input filter 505 to the synchronizer 525 and to the startcode detector 527. The synchronizer 525 and the startcode detector 527 control a time base circuit 529 which furnishes synchronizing signals to the information bits decoder circuits. A dashed line indicates that the time base circuit 529 may furnish to the startcode detector 527 a signal that indicates when the next startcode is likely to be expected.

As set out above, the input filter 505 may be a half-Nyquist filter or an R-C member. However, when the input filter 505 is a 5 MHz lowpass filter, it is preferably placed closer to the input of the decoder, so that also the sync separator 521 receives a filtered signal. The output signal of the input filter 505 is applied to a normal bit demodulator 503 and to a long bit demodulator 513. The output of the normal bit demodulator 503 is coupled to a normal bit decision circuit 515. The output of the long bit demodulator 513 is coupled to a long bit decision circuit 517. The time base circuit 529 furnishes time base signals to the normal bit demodulator 503, to the normal bit decision circuit 515, to the long bit demodulator 513, and to the long bit decision circuit 517.

Figure 6:
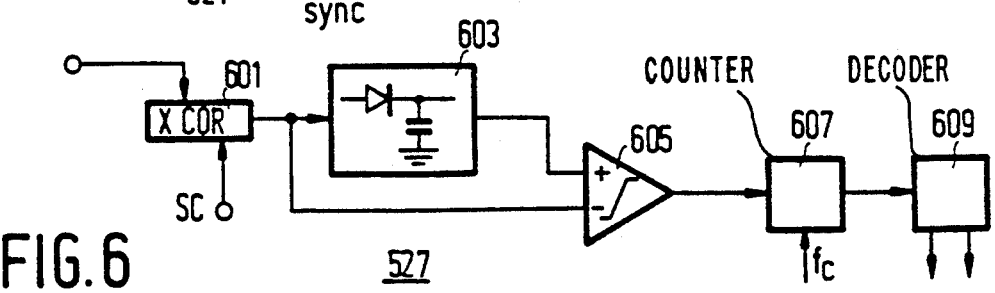
FIG. 6 shows an example of a startcode detector for use in the decoding arrangement of FIG. 5.

FIG. 6 shows a preferred embodiment of a startcode detector 527. Cross-correlator 601 cross-correlates the received channel bits with a stored startcode sequence SC. The output of cross-correlator 601 will show some small peaks until the received sequence matches the stored startcode sequence, resulting in a relatively very large correlation peak. Peak detector 603 stores the value of the largest peak received up till now. Comparator 605 compares each newly obtained correlation result with the stored value, and resets a counter 607 each time when a new correlation result exceeds a stored correlation result. After the relatively very large correlation peak, the counter 607 will no longer be reset. Decoder 609 which is coupled to the count output of counter 607, is now able to indicate to the synchronizer 525 and to the time base circuit 529 when the first information channel bit commences.

In the above description, a long biphase encoded bit lasts 2×5 clock periods. It is also possible to use 2×3 clock periods, but then the decoding reliability which can be obtained by integration of the biphase channel bits is somewhat worse; 2×3 clock periods appeared to be the minimum duration which still yielded an acceptable decoding reliability. However, in the cheap decoder implementation in which a normal biphase bit decoder is used to decode long biphase bits, the relatively low decoding reliability does not depend on the length of the long bit. It is also possible to use 2× an even number of clock periods, for example, 2×4 clock periods for a long bit. When an integrating long bit decoder is used, reliable results can be obtained; however, it is more difficult to use a normal biphase bit decoder for decoding long bits when a long bit lasts 2× an even number of clock periods.

While it is preferred to use a long biphase encoded bit which has one level for 5 clock periods and another level for 5 subsequent clock periods, other techniques are possible as well. For example, instead of biphase bits, quadphase bits may be used. In a quadphase bit, a pair of binary bits is followed by the pair of their inverses. When the second, long channel bits are an integral number of times longer than the first, normal channel bits, it is easier to design a pulse shaping (Nyquist) filter than when the second channel bits are a non-integral number of times longer than the first channel bits. When the first and second DC-free channel codes used to obtain the first and second channel bits, respectively, are identical except for the duration of the respective channel bits, relatively simple encoders and decoders can be used. However, it is also possible to use a quadphase channel code for the first, normal bits and a biphase channel code for the second, long bits. Of course, those skilled in the art will be able to design many other alternatives falling within the scope of the following claims.

We claim:

1. An extended television signal comprising control data for controlling an extended television decoder, said control data comprising:
   a first type of information bits for conveying information which need not be reliably decodable immediately upon switching between broadcast channels or when their contents have changed, each first type information bit having been channel-encoded by means of a first DC-free channel code into first channel bits each having a first duration; and
   a second type of information bits for conveying information which must be reliably decodable immediately upon switching between broadcast channels or when their contents have changed, wherein each second type information bit has been channel-encoded by means of a second DC-free channel code into second channel bits each having a second duration exceeding said first duration.

2. An extended television signal as claimed in claim 1, wherein the duration of each of said second channel bits is an integral number of times longer than the duration of each of said first channel bits.

3. An extended television signal as claimed in claim 1, wherein the duration of each of said second channel bits is at least three times longer than the duration of each of said first channel bits.

4. An extended television signal as claimed in claim 1, wherein said first and second DC-free channel codes are identical except for the duration of the respective channel bits.

5. An extended television signal as claimed in claim 4, wherein said first and second DC-free channel codes are biphase channel codes.

6. An extended television signal as claimed in claim 1, wherein a first number of first type information bits is interleaved between first and second information bits of said second type, and a second number of first type information bits is interleaved between said second and a third information bit of said second type, said first number being different from said second number.

7. A method of encoding an extended television signal, comprising the steps of:
   inserting into an extended television signal control data for controlling an extended television decoder; and
   furnishing said extended television signal;
   wherein said control data comprise:
   a first type of information bits for conveying information which need not be reliably decodable immediately upon switching between broadcast channels or when their contents have changed, each first type information bit having been channel-encoded by means of a first DC-free channel code into first channel bits each having a first duration; and
   a second type of information bits for conveying information which must be reliably decodable immediately upon switching between broadcast channels or when their contents have changed, wherein each second type information bit has been channel-encoded by means of a second DC-free channel code into second channel bits each having a second duration exceeding said first duration.

8. An encoding method as claimed in claim 7, wherein the duration of each of said second channel bits is an integral number of times longer than the duration of each of said first channel bits.

9. A decoder for decoding an extended television signal comprising control data for controlling said decoder, said decoder including control data means decoding means comprising:
   first means for decoding a first type of information bits conveying information which need not be reliably decodable immediately upon switching between broadcast channels or when their contents have changed, each first type information bit having been channel-encoded by means of a first DC-free channel code into first channel bits each having a first duration; and
   second means for decoding a second type of information bits conveying information which must be reliably decodable immediately upon switching between broadcast channels or when their contents have changed, wherein each second type information bit has been channel encoded by means of a second DC-free channel code into second channel bits each having a second duration exceeding said first duration.

10. A decoder as claimed in claim 9, wherein said first and second decoding means are identical.

11. A decoder as claimed in claim 9, wherein said first and second decoding means are arranged for decoding said first type and second type information bits when specified and wherein the duration of each of said second channel bits is an integral number of times longer than the duration of each of said first channel bits.

* * * * *